(12) United States Patent
Liu

(10) Patent No.: US 8,427,818 B2
(45) Date of Patent: Apr. 23, 2013

(54) LOCKING DEVICE, COLLAPSIBLE SUPPORT FRAME ASSEMBLY USING THE LOCKING DEVICE

(75) Inventor: Lien-Ming Liu, Sinjhuang (TW)

(73) Assignee: Jarllytec Co., Ltd., Taipei County (TW)

( * ) Notice: Subject to any disclaimer, the term of this patent is extended or adjusted under 35 U.S.C. 154(b) by 722 days.

(21) Appl. No.: 12/613,649

(22) Filed: Nov. 6, 2009

(65) Prior Publication Data
US 2010/0155559 A1 Jun. 24, 2010

(30) Foreign Application Priority Data

Dec. 18, 2008 (TW) ................................ 97149965 A

(51) Int. Cl.
G06F 1/16 (2006.01)
H05K 5/00 (2006.01)
H05K 7/00 (2006.01)

(52) U.S. Cl.
USPC ............ 361/679.05; 361/679.01; 361/679.02; 361/679.21; 248/297.21; 248/921; 248/922; 248/371; 248/125.8; 248/161; 248/157

(58) Field of Classification Search ............ 248/297.21, 248/921, 922, 371, 289.11, 282, 295.11, 248/296.1, 292.13, 125.8, 125.9, 161, 157, 248/419, 424, 429, 298.1; 361/679.01, 679.02, 361/679.05, 679.21, 679.22; 403/109.1, 403/109.2, 109.6; 292/194, 195
See application file for complete search history.

(56) References Cited

U.S. PATENT DOCUMENTS

| | | | | |
|---|---|---|---|---|
| 6,712,321 B1* | 3/2004 | Su et al. | .................. | 248/123.11 |
| 6,918,564 B2* | 7/2005 | Yen et al. | ...................... | 248/404 |
| 7,036,787 B1* | 5/2006 | Lin | ............... | 248/676 |
| 7,370,838 B2* | 5/2008 | Jeong et al. | ............... | 248/125.7 |
| 7,628,365 B2* | 12/2009 | Lee | ........... | 248/297.21 |
| 7,694,920 B2* | 4/2010 | Lien et al. | .................. | 248/125.8 |
| 7,766,296 B2* | 8/2010 | Choi et al. | .............. | 248/346.01 |
| 7,775,487 B2* | 8/2010 | Hu | ............................... | 248/157 |
| 7,775,494 B2* | 8/2010 | Yen et al. | ................... | 248/284.1 |
| 7,934,689 B2* | 5/2011 | Chiu et al. | .............. | 248/222.11 |
| 8,047,479 B2* | 11/2011 | Liu | ............... | 248/157 |
| 8,052,102 B2* | 11/2011 | Hu | ............... | 248/157 |
| 8,132,765 B2* | 3/2012 | Liu | ............... | 248/157 |
| 2006/0038104 A1* | 2/2006 | Choi | ............... | 248/370 |
| 2007/0064380 A1* | 3/2007 | Shin | ............................. | 361/681 |

* cited by examiner

*Primary Examiner* — Terrell McKinnon
*Assistant Examiner* — Michael McDuffie
(74) *Attorney, Agent, or Firm* — Guice Patents PLLC

(57) ABSTRACT

A collapsible support frame assembly includes a support frame having two parallel sliding rails, a slide holder coupled to and movable along the sliding rails of the support frame, a constant force spring mounted between the support frame and the slide holder, and a locking device having a casing affixed to the support frame and a stop member pivotally mounted in an accommodation chamber inside the casing. When the support frame is turned from a vertical position to a horizontal position, the stop member is forced by the gravity thereof to bias out of the accommodation chamber relative to the casing and to stop against the slide holder, thereby locking the slide holder, facilitating packing and delivery.

14 Claims, 7 Drawing Sheets

US 8,427,818 B2

LOCKING DEVICE, COLLAPSIBLE SUPPORT FRAME ASSEMBLY USING THE LOCKING DEVICE

BACKGROUND OF THE INVENTION

1. Field of the Invention

The present invention relates to support frames for supporting a display panel and more particularly, to a collapsible support frame assembly that facilitates packing and delivery. The invention relates also to a locking device for use in the collapsible support frame assembly.

2. Description of the Related Art

Following population of LCD display devices, many advanced LCD panel support frames have been created, facilitating horizontal angle adjustment, tilting angle adjustment and/or elevation adjustment. A LCD panel support frame is known comprising a base, a support frame mounted on the base, and a slide holder mounted on and movable along the support member for holding a LCD panel. The support frame comprises two vertical fixed rails and two sliding rails respectively slidably coupled to the fixed rails. The slide holder is slidably coupled to the sliding rails. In order to have the display panel be positioned in the adjusted position, a constant force spring is provided between the fixed rails and the sliding rails to impart an upward force to the slide holder against the weight of the display panel.

To facilitate packing and delivery, the support frame can be turned relative to the base from the operative vertical position to the non-operative horizontal position. However, when the support frame is set in the non-operative horizontal position, the weight of the display panel cannot be kept in balance with the spring force of the constant force spring. Thus, the display panel may be forced to move relative to the support frame accidentally during delivery, causing damage.

Further, the support frame of the aforesaid conventional LCD panel support frame is narrow and long, and pivotally connected with its bottom side to the base. Therefore, this design of LCD panel support frame is less stable.

Therefore, it is desirable to provide a LCD panel support frame structure, which allows locking of the display panel in the collapsed horizontal position and, prevents vibration of the support frame.

SUMMARY OF THE INVENTION

The present invention has been accomplished under the circumstances in view. It is one object of the present invention to provide a collapsible support frame assembly, which uses a locking device to stop a slide holder thereof from outward displacement when the support frame is turned from the operative vertical position to the non-operative horizontal position, facilitating packing and delivery.

It is another object of the present invention to provide a locking device for collapsible support frame assembly, which has a stop member pivotally mounted in a casing so that when the casing is turned through an angle, the stop member is forced by its gravity to bias to the outside of the casing for locking.

It is still another object of the present invention to provide a collapsible support frame assembly, which utilizes reinforcing members to reinforce the structural strength of the support frame against vibration.

To achieve these and other objects of the present invention, a collapsible support frame assembly comprises a support frame, the support frame comprising two sliding rails arranged in parallel at two opposite lateral sides thereof, two pivot shafts respectively pivotally arranged at the bottom side of each of the two sliding rails; a slide holder coupled to and movable along the sliding rails of the support frame; a constant force spring mounted between the support frame and the slide holder; and at least one locking device, each locking device comprising a casing affixed to the support frame, an accommodation chamber defined in the casing, and a stop member, the stop member having coupling means disposed at one side thereof and pivotally mounted inside the accommodation chamber. When the support frame is turned from a vertical position to a horizontal position, the stop member is forced by the gravity thereof to bias out of the accommodation chamber relative to the casing and to stop against the slide holder, thereby locking the slide holder.

Further, the support frame comprises a flat base panel, a substantially reverse U-shaped bottom panel formed integral and backwardly extended from the bottom side of the base panel, two pivot shafts respectively pivotally mounted on the substantially reverse U-shaped bottom pane and two first reinforcing plates respectively connected between the sliding rails and the reverse U-shaped bottom panel at an inner side.

To achieve these and other objects of the present invention, a locking device comprises a casing, an accommodation chamber defined in the casing, a stop wall formed at top side thereof, and a stop member, which has coupling means disposed at top side thereof and pivotally mounted inside the accommodation chamber. When the casing is turned from a vertical position to a horizontal position, the stop member is forced by the gravity thereof to bias out of the accommodation chamber relative to the casing and to stop against the stop wall for locking.

DETAILED DESCRIPTION OF THE PREFERRED EMBODIMENT

Figure 1:
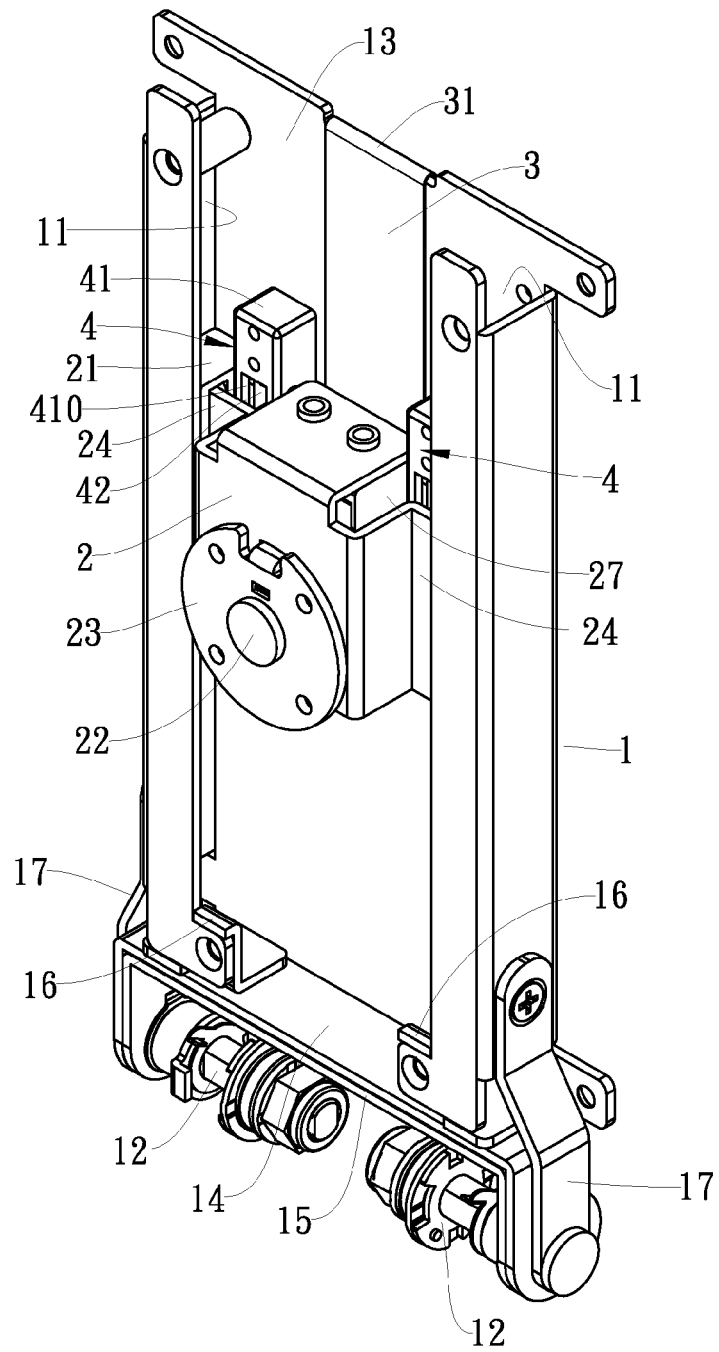
FIG. 1 is an elevational assembly view of a collapsible support frame assembly in accordance with the present invention.
Figure 2:
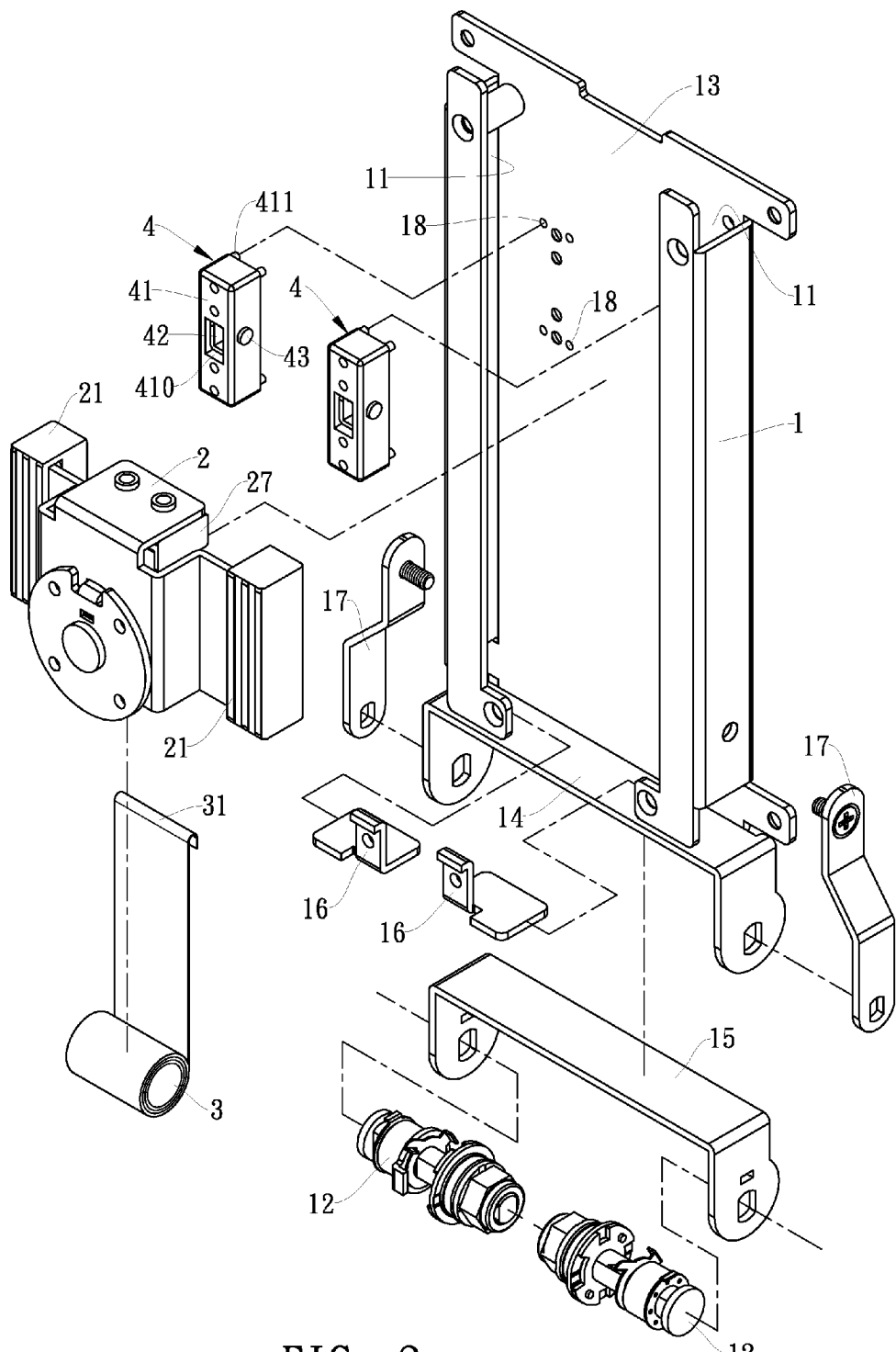
FIG. 2 is an exploded view of the collapsible support frame assembly in accordance with the present invention.

Referring to FIGS. 1 and 2, a collapsible support frame assembly in accordance with the present invention is shown comprising a support frame 1, a slide holder 2, a constant force spring 3 and at least one locking device 4.

The support frame 1 comprises a flat base panel 13, two sliding rails 11 formed integral and backwardly extended from two opposite lateral sides of the base panel 13, two pivot shafts 12 respectively pivotally arranged at the bottom side of each of the two sliding rails 11, a substantially reverse U-shaped bottom panel 14 formed integral and backwardly extended from the bottom side of the base panel 13, a substantially reverse U-shaped reinforcing frame bar 15 fastened to the reverse U-shaped bottom panel 14, two first reinforcing plates 16 respectively connected between the sliding rails 11 and the reverse U-shaped bottom panel 14 at an inner side and two second reinforcing plates 17 respectively connected between the sliding rails 11 and the reverse U-shaped bottom panel 14 at an outer side. The reverse U-shaped reinforcing frame bar 15, the first reinforcing plates 16 and the second reinforcing plates 17 reinforce the structural strength of the base panel 13 against vibration.

The slide holder 2 is slidably coupled to the sliding rails 11 of the support frame 1 by two sliding blocks 21 and adapted to hold a display panel so that the supported display panel can be moved with the slide holder 2 up and down along the sliding rails 11.

The constant force spring 3 is connected between the support frame 1 and the slide holder 2 to impart an upward force to the slide holder 2 relative to the support frame 1, having the end 31 thereof affixed to the top edge of the base panel 13 of the support frame 1.

The locking device 4 comprises a casing 41, which is affixed to the support frame 1 and defines therein an accommodation chamber 410, a stop member 42 pivotally mounted inside the accommodation chamber 410. When the support frame 1 is turned to horizontal, the stop member 42 is forced by the gravity thereof to bias out of the accommodation chamber 410 and to stop against the slide holder 2, thereby locking the slide holder 2. According to the present preferred embodiment, two locking devices 4 are installed.

Figure 3:
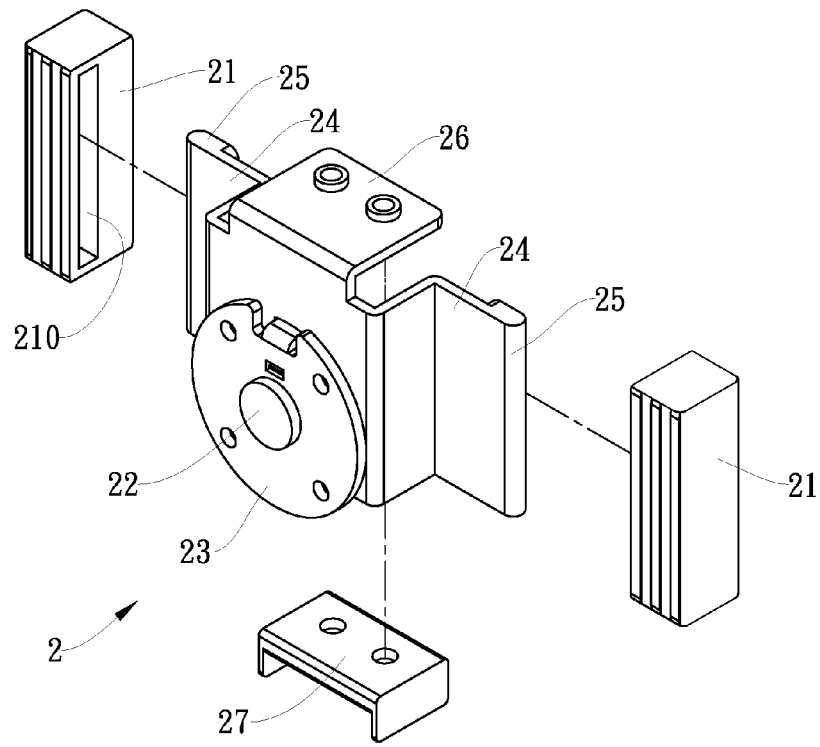
FIG. 3 is an exploded view of the slide holder according to the present invention.
Figure 4:
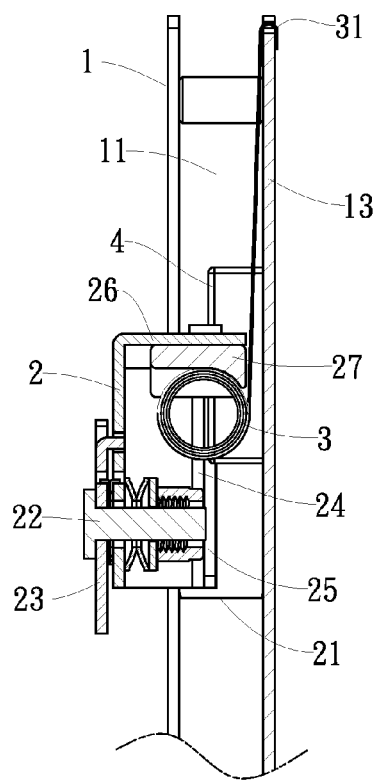
FIG. 4 is a sectional view of a part of the present invention showing the structure of the slide holder.

Referring to FIGS. 3 and 4, the slide holder 2 has a locating plate 23 pivotally connected to the front side thereof by a pivot 22 for the mounting of a display panel. The slide holder 2 has two extension boards 24 respectively extended from the two opposite lateral sides thereof. Each extension board 24 terminates in a connection portion 25. The extension boards 24 are disposed at the front side of the locking devices 4. Further, each sliding block 21 has a coupling groove 210 for receiving the connection portion 25 of one extension board 24 of the slide holder 2. The slide holder 2 further has top panel 26. A locating block 27 is provided at the bottom side of the top panel 26. The constant force spring 3 is provided at the bottom side of the locating block 27, allowing the end 31 thereof to be affixed to the top edge of the base panel 13 of the support frame 1. The bottom side of the locating block 27 is configured to fit the curvature of the constant force spring 3.

Figure 5:
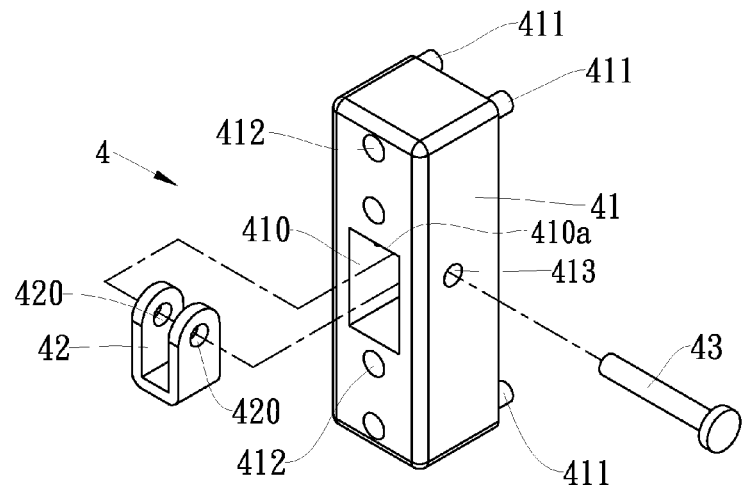
FIG. 5 is an exploded view of the locking device according to the present invention.

Referring to FIG. 5, the casing 41 of each locking device 4 has a plurality of mounting rods 411 extended from the back side thereof and respectively fastened to respective locating holes 18 on the base panel 13 of the support frame 1, and a plurality of mounting through holes 412 for the mounting of fastening elements (not shown) to affix the casing 41 to the base panel 13 of the support frame 1. The top side of the accommodation chamber 410 forms a stop wall 410a. Two pivot holes 413 are respectively formed on the two opposite lateral sidewalls of the accommodation chamber 410 and aligned in line. The stop member 42 is a substantially U-shaped member having a coupling portion, i.e., pivot hole 420 located on each of the two distal ends thereof. A pivot bolt 43 is inserted through the pivot holes 413 of the casing 41 and the pivot holes 420 of the stop member 42 to pivotally connect the stop member 42 to the casing 41. The pivot holes 420 of the stop member 42 are loosely coupled to the pivot bolt 43 so that the stop member 42 will be forced by its gravity to turn about the pivot bolt 43 relative to the casing 41 during rotation of the casing 41. When the casing 41 is kept in horizontal, the stop member 42 extends out of the accommodation chamber 410.

Figure 6:
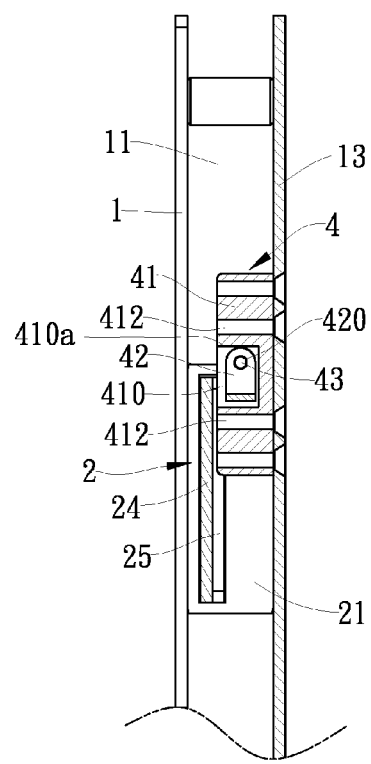
FIG. 6 is sectional view of a part of the present invention, showing the structure of the slide holder and the locking device.

Referring to FIG. 6, when the support frame 1 is kept in vertical, the extension boards 24 of the slide holder 2 are disposed in front of the locking devices 4, and the sliding blocks 21 can be moved with the slide holder 2 upwards or downwards along the sliding rails 11. At this time, the stop members 42 of the locking devices 4 are received inside the associating accommodation chambers 410 of the associating casings 41 in the unlocking position.

Figure 7:
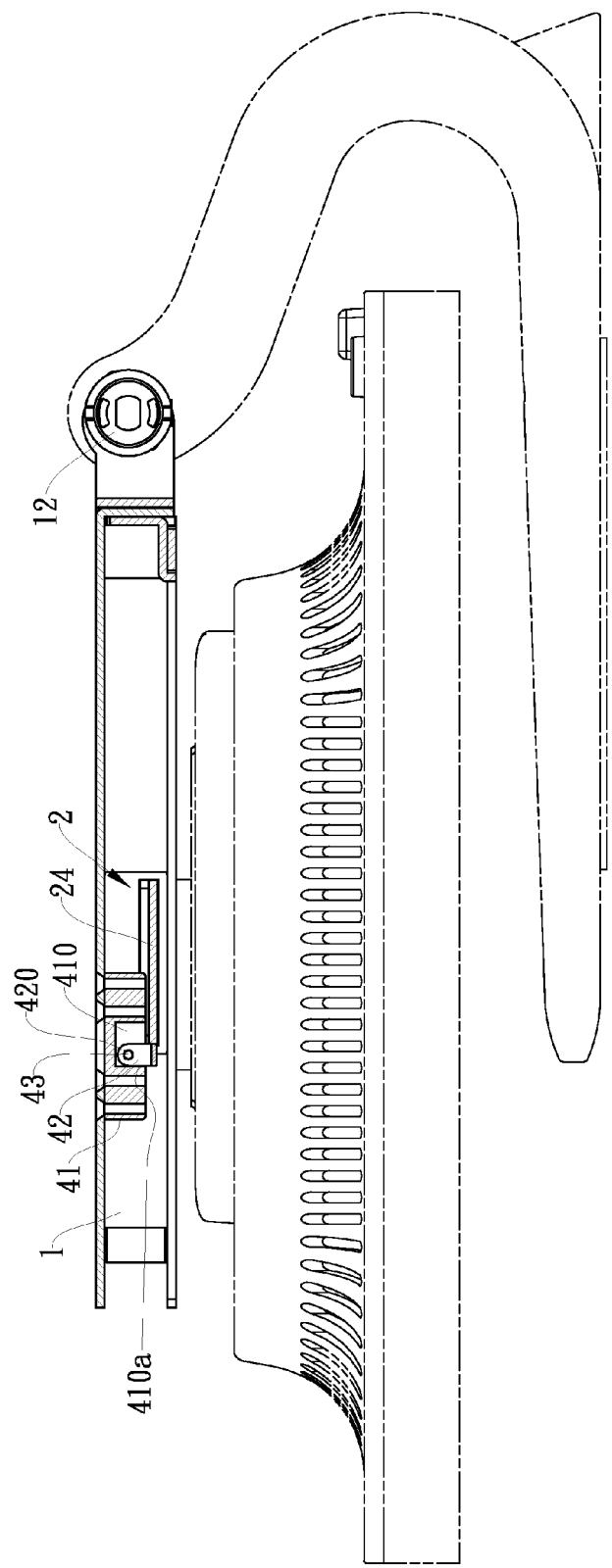
FIG. 7 is a schematic sectional applied view of the present invention, showing the support frame turned to horizontal.
Figure 8:
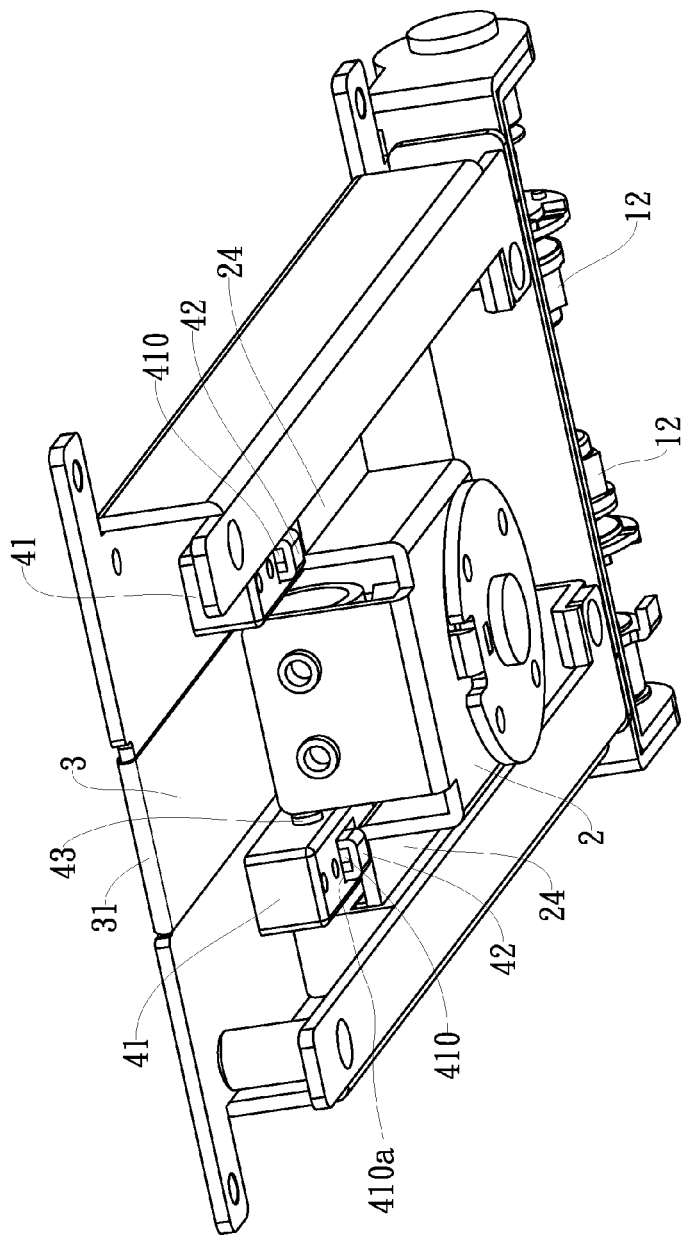
FIG. 8 is an oblique elevation of the present invention, showing the support frame turned to horizontal.

Referring to FIGS. 7 and 8, when the support frame 1 is turned about the pivot shafts 12 from vertical to horizontal, the stop members 42 of the locking devices 4 are turned about the associating pivot bolts 43 relative to the associating casings 41 in the reversed direction to extend out of the accommodation chambers 410 of the associating casings 41, the display panel can then be pushed toward the pivot shafts 12 to move the slide holder 2 downwards along the sliding rails 11, thereby forcing the stop members 42 to be turned back into the inside of the accommodation chamber 410. Immediately after disconnection of the top edges of the extension boards 24 of the slide holder 2 from the stop members 42, the stop members 42 of the locking devices 4 are turned out of the associating accommodation chambers 410 to stop against the top edges of the extension boards 24 of the slide holder 2 that is moved upwards by the spring force of the constant force spring 3. Because the stop members 42 of the two locking devices 4 are stopped at the stop wall 410a at the top side of the accommodation chamber 410 at this time, the slide holder 2 is locked, facilitating packing and delivery of the support frame and lock assembly and the attached display panel.

Collapsing of the support frame and lock assembly and the attached display panel can be done in another way by: moving the slide holder 2 downward to the location where the top edges of the extension boards 24 of the slide holder 2 are disposed below the elevation of the stop members 42 of the two locking devise 4, and then turning the support frame 1 from vertical to horizontal to let the stop members 42 turn out of the associating accommodation chambers 410, and then releasing the slide holder 2 for enabling the slide holder 2 to be pushed upwards by the spring force of the constant force spring 3 and stopped against the stop members 42.

When wishing to unlock the display panel and to set the display panel in vertical, turn the display panel to vertical, and then force the display panel to move the slide holder 2 downwards for enabling the stop members 42 of the locking devices 4 to turn about the associating pivot bolts 43 to the bottom side. When the top edges of the extension boards 24 of the slide holder 2 are disconnected from the associating stop members 42, the stop members 42 are turned back to the inside of the associating accommodation chambers 410. At this time, release the display panel for enabling the slide holder 2 to be moved upwards along the sliding rails 11. When unlocked the locking devices 4, the display panel can be freely adjusted to the desired elevation.

Figure 9:
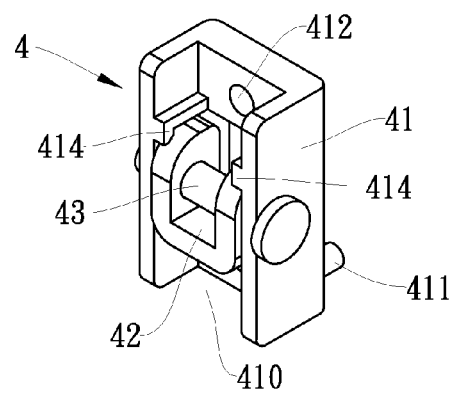
FIG. 9 is an oblique elevation of an alternate form of the locking device according to the present invention.
Figure 10:
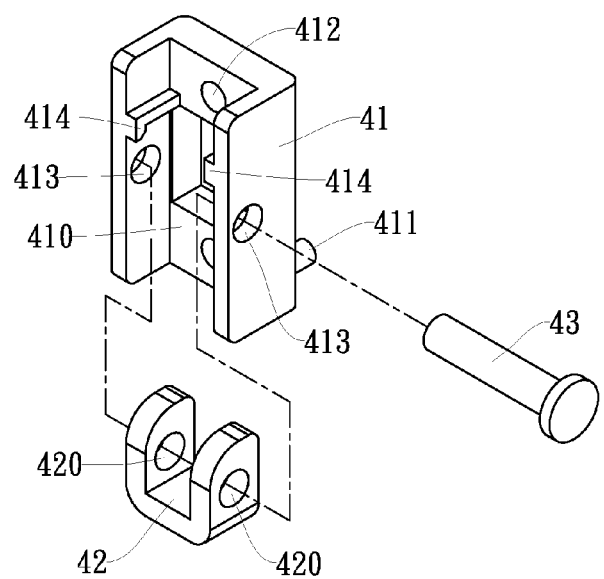
FIG. 10 is an exploded view of the locking device shown in FIG. 9.

FIGS. 9 and 10 show an alternate form of the locking device 4. According to this alternate form, the locking device 4 comprises a casing 41, an accommodation chamber 410 defined in the casing 41 and cut through the top and bottom sides of the casing 41, two pivot holes 413 axially aligned at two opposite lateral sides relative to the accommodation chamber 410, two stop flanges 414 respectively protruded from the inside wall of the casing 41 and bilaterally suspending in the accommodation chamber 410 above the pivot holes 413, a plurality of mounting rods 411 extended from the back side of the casing 41 for fastening to the locating holes 18 on the base panel 13 of the support frame 1, and a plurality of mounting through holes 412 for the mounting of fastening elements (not shown) to affix the casing 41 to the base panel 13 of the support frame 1, a stop member 42 that is a substantially U-shaped member having a coupling portion, i.e., pivot hole 420 located on each of the two distal ends thereof, and a pivot bolt 43 inserted through the pivot holes 413 of the casing 41 and the pivot holes 420 of the stop member 42 to pivotally connect the stop member 42 to the casing 41. The pivot holes 420 of the stop member 42 are loosely coupled to the pivot bolt 43 so that the stop member 42 will be forced to turn about the pivot bolt 43 relative to the casing 41 by the gravity thereof during rotation of the casing 41. When the support frame 1 is turned from vertical to horizontal, the stop member 42 is forced by its gravity to turn about of the pivot bolt 43 to the outside of the accommodation chamber 410 for stopping the slide holder 2. When the stop member 42 is turned out of the accommodation chamber 410 and stopped with its one side against the slide holder 2, it is stopped with its other side against the flanges 414, and therefore the display panel is locked.

Although particular embodiments of the invention have been described in detail for purposes of illustration, various modifications and enhancements may be made without departing from the spirit and scope of the invention. Accordingly, the invention is not to be limited except as by the appended claims.

What is claimed is:

1. A collapsible support frame assembly, comprising:
    a support frame, said support frame comprising two sliding rails arranged in parallel at two opposite lateral sides thereof;
    a slide holder coupled to and movable along said sliding rails of said support frame;
    a constant force spring mounted between said support frame and said slide holder; and
    at least one locking device, each said locking device comprising a casing affixed to said support frame, an accommodation chamber defined in said casing, and a stop member pivotally mounted in said casing, said stop member having coupling device disposed at a top side thereof and pivotally connected to a part of said casing inside said accommodation chamber;
    wherein when said support frame is turned from a vertical position to a horizontal position, said stop member is forced by the gravity thereof to bias out of said accommodation chamber relative to said casing and to stop against said slide holder, thereby locking said slide holder;
    wherein said accommodation chamber extends vertically through top and bottom sides of said casing; said casing comprises two pivot holes axially aligned at two opposite lateral sides relative to said accommodation chamber and two stop flanges bilaterally suspending inside said accommodation chamber above said pivot holes.

2. The collapsible support frame assembly as claimed in claim 1, wherein said stop member of each said locking device has a U-shaped profile; said accommodation chamber comprises a stop wall at top side thereof adapted for stopping said stop member.

3. The collapsible support frame assembly as claimed in claim 1, wherein said casing comprises two pivot holes axially aligned at two opposite lateral sides of said accommodation chamber; said coupling device of said stop member comprises two pivot holes loosely and pivotally connected between the pivot holes of said casing with a pivot bolt.

4. The collapsible support frame assembly as claimed in claim 1, wherein said casing comprises a plurality of mounting rods extended from a back side thereof and a plurality of mounting through holes for mounting; said support frame comprises a plurality of locating holes for receiving the mounting rods of said casing.

5. The collapsible support frame assembly as claimed in claim 1, wherein said slide holder comprises two connection portions respectively disposed at two opposite lateral sides thereof, and two sliding blocks for slidably securing said connection portions to said sliding rails of said support frame, each said sliding block comprising a coupling groove for receiving one said connection portion.

6. The collapsible support frame assembly as claimed in claim 1, wherein said slide holder comprises two extension boards respectively extended from the two opposite lateral sides thereof and disposed in front of said at least one locking device.

7. The collapsible support frame assembly as claimed in claim 1, wherein said slide holder comprises a top panel and a locating block arranged at a bottom side of said top panel, said locating block having a bottom side configured to fit the curvature of said constant force spring; said constant force spring is arranged at a bottom side of said locating block opposite to said top panel of said slide holder, having the end thereof affixed to a top edge of said support frame.

8. The collapsible support frame assembly as claimed in claim 1, wherein said support frame comprises a flat base panel, a substantially reverse U-shaped bottom panel formed integral and backwardly extended from a bottom side of said base panel, two pivot shafts respectively pivotally mounted on said substantially reverse U-shaped bottom panel and two first reinforcing plates respectively connected between said sliding rails and said reverse U-shaped bottom panel at an inner side.

9. The collapsible support frame assembly as claimed in claim 1, wherein said support frame further comprises a substantially reverse U-shaped reinforcing frame bar fastened to said reverse U-shaped bottom panel and two second reinforcing plates respectively connected between said sliding rails and said reverse U-shaped bottom panel at an outer side.

10. A locking device, comprising:
    a casing, said casing comprising an accommodation chamber and stop device disposed at a top side relative to said accommodation chamber; and
    a stop member, said stop member having coupling device disposed at one side thereof and pivotally mounted inside said accommodation chamber;
    wherein when said casing is rotated through a predetermined angle, said stop member is turned out said accommodation chamber from an unlocking position to a locking position;
    wherein said accommodation chamber extends vertically through top and bottom sides of said casing; said casing comprises two pivot holes axially aligned at two opposite lateral sides relative to said accommodation chamber and two stop flanges bilaterally suspending inside said accommodation chamber above said pivot holes.

11. The locking device as claimed in claim 10, wherein said stop member has a U-shaped profile.

12. The locking device as claimed in claim 10, wherein said casing comprises two pivot holes axially aligned at two opposite lateral sides of said accommodation chamber; said coupling device of said stop member comprises two pivot holes loosely and pivotally connected between the pivot holes of said casing with a pivot bolt.

13. The locking device as claimed in claim 10, wherein said casing has a top wall disposed at a top side of said accommodation chamber and forming said stop device.

14. The locking device as claimed in claim 10, wherein said casing comprises a plurality of mounting rods extended from a back side thereof; said support frame comprises a plurality of locating holes for receiving the mounting rods of said casing.

* * * * *